No. 760,684.

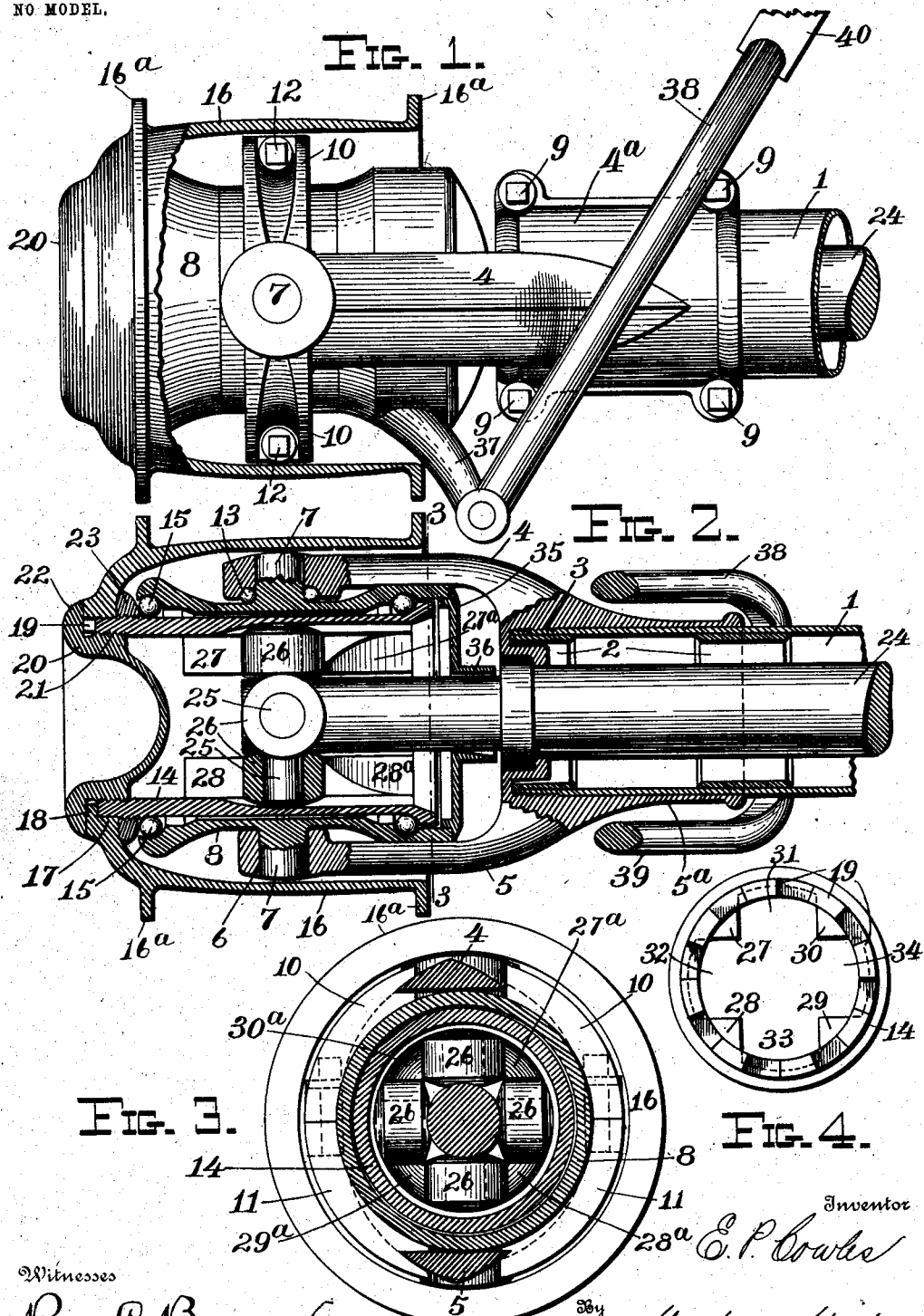

Patented May 24, 1904.

UNITED STATES PATENT OFFICE.

EDWARD P. COWLES, OF WARREN, OHIO.

HUB FOR MOTOR-VEHICLES.

SPECIFICATION forming part of Letters Patent No. 760,684, dated May 24, 1904.

Application filed December 31, 1901. Serial No. 87,883. (No model.)

*To all whom it may concern:*

Be it known that I, EDWARD P. COWLES, a citizen of the United States, residing at Warren, in the county of Trumbull, State of Ohio, have invented certain new and useful Improvements in Hubs for Motor-Vehicles, of which the following is a specification.

The purpose of this invention is to provide an improved driving and steering hub for motor-vehicles designed with special reference to utilizing all the wheels of a vehicle for driving as well as steering and in which the pivotal connection between the hub and the axle is in the revolving plane of the wheel. The hubs may also be used as driving and steering hubs on the forward axle in connection with the ordinary non-steering driving-hubs on the rear axle of a vehicle. The arrangement is such that the weight of the vehicle and the stress upon the wheels are borne by a fixed axle or part of the running-gear, and the driving-shaft or axle is subject only to the torsional stress required to drive the vehicle.

In the accompanying drawings, Figure 1 is a plan view of the hub and connected parts, the hub-rim being partly broken away. Fig. 2 is a vertical section through the hub and connected parts. Fig. 3 is a section on the line 3 3 of Fig. 2, and Fig. 4 is an outer end view of the axle-box.

Referring to the drawings, 1 indicates a fixed tubular axle forming part of the running-gear of a vehicle, upon which the weight of the vehicle-body is sustained. The outer end of the axle is provided with suitable interior reinforcing-rings 2, and it is exteriorly threaded, as indicated by the reference-numeral 3. Upon the outer end of the tubular axle is secured a fork having two arms 4 and 5, which project outwardly beyond the end of the axle in a vertical plane, each arm having near its outer end an eye 6, adapted to receive one of the vertical trunnions 7, projecting radially from opposite sides of a hollow cylinder or bearing-sleeve 8. These trunnions are preferably formed integral with the sleeve, and for convenience in assembling the fork is made in two parts, the arm 4 being formed integral with an upper semicylindrical clamping portion $4^a$ and the lower arm 5 being formed integral with a similar clamping portion $5^a$. These clamping portions are interiorly threaded to engage the threaded portion 3 of the tubular axle, and they are clamped to said axle by means of suitable bolts 9. This combined clamping and threaded connection between the fork and the tubular axle not only permits the eyes of the fork to be placed readily over the trunnions 7, but provides a very strong and secure joint between the fork and the axle. To further strengthen the fork, the outer ends of the fork-arms are connected by semicircular curved arms 10 and 11, which extend around the sleeve 8 and are secured together at their meeting-points by bolts 12. The fork-arms are thus tied together at their outer ends, and the weight and stress upon the fork is necessarily distributed between the two arms. By reference to Figs. 1 and 3 it will be observed that although the trunnions 7 are arranged in the plane of revolution of the wheel the arms 4 5 of the supporting-fork are offset slightly from the vertical plane of the rotating axis of the wheel. When the steering-wheels are outside of the curve they are turning, they swing laterally to a less extent than when on the inside of such curve, owing to their revolving planes being always tangential to concentric circles. By offsetting the fork-arms 4 5 slightly from the plane of the axis of revolution of the wheel and shaping their outside surfaces to conform to the inner face of the outer hub member when turned laterally to their extreme limit I am enabled to employ arms 4 5 of relatively large cross-section, while using a hub of minimum diameter, and also to make said arms substantially triangular in cross-section, as shown in Fig. 3, which form is well adapted to resist lateral strains on said arms. A ball-bearing 13 is arranged around the upper trunnion 7, between the fork-arm 4 and the sleeve 8. A sufficient clearance is provided between the curved arms 10 and 11 and the exterior of the sleeve to permit the latter to oscillate in a horizontal plane through the maximum angle required for steering the vehicle.

Within the sleeve 8 is revolubly mounted an axle-box 14, suitable bearings 15 being arranged between said box and sleeve. Upon the outer end of the box 14 is detachably secured a hub-rim 16. This hub-rim, as shown, is formed with a boss 17 at its outer end, which fits closely over the outer end of the axle-box and is provided with a flange having radial teeth 18, which interlock with teeth 19, formed upon the end of the axle-box. The body portion of the hub-rim, as shown, extends inwardly and surrounds the central parts of the hub, the spoke-flanges 16$^a$ being equidistant from the trunnions 7, so that said trunnions are in the revolving plane of the wheel. This hub-rim is detachably secured to the axle-box by a suitable nut 20, having a threaded connection 21 with the interior of the axle-box and a flange 22, which projects radially outward and bears against the outer face of the boss 17, holding the teeth upon the flange in locking engagement with the toothed face of the axle-box. A suitable adjusting-collar or ball-cone 23 is provided upon the axle-box for giving the proper adjustment of the ball-bearings 15. This cone is locked by and serves as a stop for the hub-boss 17, which is forced against the cone by the nut 20. When the hub-rim and axle-box are thus secured together, it will be plain that the rotation of the axle-box will cause the hub-rim to be positively driven.

The driving axle or shaft 24 extends longitudinally through the fixed tubular axle 1 and into the interior of the axle-box. Projecting radially from the driving-shaft, at or near the end thereof and in the same plane as the trunnions 7, are several studs or pins 25, preferably four in number, and extending at angles of ninety degrees to one another. Surrounding each stud is a roller 26. Ribs or guide-pieces 27, 28, 29, and 30 are arranged longitudinally within the interior of the axle-box and either integral therewith or otherwise secured thereto. The opposing faces of adjacent ribs are parallel with one another and separated by sufficient distance to permit one of the rollers 26 to move longitudinally and roll between the opposing faces with as little side play as possible. Thus four guide-slots 31, 32, 33, and 34 are formed between the guide-pieces, and the four studs upon the driving-shafts, with their surrounding rollers, extend into the slots and are adapted to bear against the guide-pieces. It will be seen that a universal joint is thus formed between the driving-shaft and the axle-box, which will permit the box to turn in a horizontal plane relatively to the shaft. The rotation of the shaft by the driving power causes the rollers to bear against the guide-pieces, and thus turn the axle-box and hub. As the power is transmitted from the shaft to the axle-box in the plane of the trunnions 7 as well as the revolving plane of the wheel, it will be obvious that the driving-shaft will not tend to cause a deflection of the wheel. When the hub is deflected to steer the vehicle, the studs 25 and rollers 26 describe a sort of a gyratory motion relatively to the axle-box; but as the center of gyration in the universal joint is at the point where the horizontal axis of the box and the vertical axis of the trunnions intersect and in the revolving plane of the wheel the driving power will not tend to deflect the wheel, and obstructions upon the road will have little or no tendency to deflect the wheel or strain the steering mechanism. To permit the hub to swing about the trunnions without interference between the guide-pieces and the driving-shaft, said guide-pieces are cut away at their inner ends, as indicated by reference-numerals 27$^a$, 28$^a$, 29$^a$, and 30$^a$. A dust-guard 35 is secured to the inner end of the sleeve 8 and provided with a central horizontal slot 36, through which the driving-shaft extends. The hub is conveniently oscillated about the trunnions by means of an arm 37, attached to one side of the sleeve 8, and a lever suitably connected to said arm. In the present instance the arm 37 is connected to the forks 38 and 39 upon a rod 40, which latter is intended to be connected with the hand-operated steering devices, the arrangement shown being suitable for a vehicle in which four or more of the wheels are driving as well as steering wheels and in which each wheel is connected by a separate rod 40 to steering devices at a common steering-center and all operated simultaneously to steer the vehicle.

It will be evident that neither the rotation of the axle-box on its axis nor its oscillation in a horizontal plane will have any tendency to disturb the alinement of the shaft 24, and the driving-shaft is not subject to the weight of the vehicle or the stress upon the wheels.

The hub-rim, it will be noted, may be quickly removed from the axle-box in case of damage by simply removing the nut 20, and a spare wheel may be immediately applied to the axle-box without disturbing the adjustment of the ball-bearings. The axle-boxes of all the hubs being alike, the wheels can be readily interchanged.

Having thus described my invention, what I claim, and desire to secure by Letters Patent of the United States, is—

1. The combination with a fixed support of a driving and steering hub comprising a sleeve pivotally connected to said support, a tubular trunnion or axle-box journaled within said sleeve, a hub-rim connected to said axle-box and a driving-shaft connected to said axle-box by a universal joint.

2. The combination with a fixed support of a driving and steering hub comprising a sleeve pivotally connected to said support, a tubular trunnion or axle-box journaled within said sleeve, a hub-rim connected to the outer end of said box and extending inwardly around the sleeve, and a driving-shaft connected to said axle-box by a universal joint.

3. The combination with a fixed support of a driving and steering hub comprising a sleeve pivotally connected to said support, a tubular trunnion or axle-box journaled within said sleeve, said box having ribs or shoulders therein, and a driving-shaft extending into the axle-box and having lateral projections engaging said ribs.

4. The combination with a fixed support of a driving and steering hub comprising a sleeve pivotally connected to said support, a tubular trunnion or axle-box journaled within said sleeve, said box having longitudinally-extending ribs or shoulders therein, and a driving-shaft extending into the axle-box and having laterally-projecting studs extending into the spaces between the ribs, and rollers upon said studs.

5. The combination with a fixed support of a driving and steering hub comprising a sleeve pivotally connected at diametrically opposite points to said support, a tubular trunnion or axle-box journaled in said sleeve, means for attaching a wheel to said axle-box and a driving-shaft connected to said axle-box by a universal joint, said joint being in line with the pivotal axis of the sleeve.

6. The combination with a fixed tubular axle of a pair of fork-arms secured to and projecting beyond the end of the axle in a vertical plane, a sleeve pivoted at its opposite sides between the arms of said fork, an axle-box journaled in the sleeve, means for connecting a wheel to said sleeve, and a driving-axle connected by a universal joint to the interior of the axle-box.

7. The combination with a fixed axle and a pair of fork-arms secured thereto and having eyes at their outer ends, of a wheel-hub including a bearing-sleeve arranged within the hub and having trunnions fitting within said eyes, and a driving-shaft connected to said sleeve by a universal joint.

8. The combination with a fixed support, of a driving and steering hub comprising a bearing-sleeve, a driving-shaft connected to said sleeve by a universal joint, a tubular trunnion or axle-box journaled within said sleeve, a hub-rim connected to the outer end of said axle-box and extending inwardly around the sleeve, and pivotal connections between said support and sleeve in the plane of rotation of the wheel.

9. The combination with a fixed axle of a pair of separable fork-arms secured to said axle, said fork-arms being connected together at their outer ends by transverse curved arms, and a wheel-hub having a bearing-sleeve pivotally mounted between the arms of the fork.

10. In a vehicle-hub the combination with a fixed support and a bearing-sleeve pivotally secured to said support, of an axle-box journaled within said sleeve, said axle-box having teeth or projections at its outer end, a hub-rim adapted to fit onto said axle-box, and having a toothed flange adapted to interlock with the projections upon the box, a nut for securing said rim upon the box and a driving-shaft arranged to rotate the axle-box.

11. The combination with a fixed support of a driving and steering hub comprising a sleeve pivotally connected at diametrically opposite points to said support, a tubular trunnion or axle-box journaled in said sleeve, and a driving-shaft connected to said axle-box by a universal joint said joint being in line with the pivotal axis of the sleeve.

12. The combination with a fixed support of a driving and steering hub comprising a sleeve pivotally connected at diametrically opposite points to said support, a tubular trunnion or axle-box journaled in said sleeve, and a driving-shaft connected to said axle-box by a universal joint said joint being at the intersection of the axial and pivotal lines of the sleeve.

13. The combination with an axle and a wheel-hub, of a fork secured to the axle and having its members extending into the hub and engaging vertical steering-trunnions therein, arms secured to said fork members and extending about a portion of the hub, and means detachably connecting the said arms of one fork member to the corresponding arms of the other fork member.

14. The combination with a fixed axle, of a pair of separable fork-arms secured to said axle, and a wheel-hub having vertical trunnions mounted in said arms.

15. The combination with a fixed axle, of a pair of separable fork-arms secured to said axle and each having an eye formed therein near its outer end, a wheel-hub having trunnions fitting within said eyes, and means connecting the fork-arms at or near their outer ends.

16. The combination with a fixed axle, and a hub including two concentric tubular members, of a pair of separable fork-arms secured to the axle and extending into the hub between said concentric members thereof, trunnions connected with the hub and extending into bearings in said fork-arms, and curved arms extending about the inner member of the hub and connecting the fork-arms within the hub.

17. The combination with a fixed axle, of a pair of separable fork-arms each having at one end an expanded clamping portion and having an eye formed near its opposite end, means for connecting said expanded sections of the arms to the stationary axle, a hub having trunnions fitting in the eyes in said fork-arms, and means connecting said arms at or near their apertured ends.

18. The combination with a fixed axle having an external thread formed thereon, of a pair of fork-arms each having at one end an expanded portion provided on its inner face with threads adapted to engage the thread on the axle, means connecting said expanded ends of the fork-arms and clamping them to the axle, and a wheel-hub mounted to turn about trunnions fitting in eyes formed in the fork-arms near the outer ends thereof.

19. The combination of a fixed axle, a driving-shaft within the axle, a hub secured to the shaft and having a hollow spoke-bearing member projecting over the end of the axle, and a bearing between said shaft and axle within the hub.

20. The combination with an axle, and a wheel-hub, of antifriction-bearings interposed between the axle and hub, and means connecting the hub and axle and permitting removal of the hub without disturbing or removing said bearings.

21. The combination of an axle, two concentric sleeves supported by the axle, antifriction-bearings arranged between said sleeves, a wheel-hub, and means detachably connecting said hub with one of said sleeves, whereby the hub can be removed without in any manner disturbing the bearings or supports therefor.

22. The combination of an axle, a wheel-hub consisting of two concentric sections, adapted to receive between them a tubular bearing-piece supported by the axle, and antifriction-bearings arranged between the inner hub-section and said bearing-piece, the hub-sections being detachably connected together, whereby the outer, spoke-engaging member, may be removed without removing or disturbing the bearings between the hub and axles.

23. The combination of an axle, a sleeve supported by the axle and having a plurality of teeth or projections at its outer end, a wheel-hub extending concentric with said sleeve and having a toothed flange engaging the projections at the outer end of the sleeve, and a removable fastening holding said hub and sleeve in engagement.

24. The combination of an axle, a sleeve supported by the axle, antifriction-bearings arranged between said sleeve and the support therefor, a wheel-hub extending concentric with said sleeve and having means detachably engaging therewith, and a removable fastening holding the hub and sleeve in engagement.

25. The combination with an axle, and a wheel-hub, of a steering-fork connecting said axle and hub, the said fork being offset from the vertical plane of the axis of revolution of the hub.

26. The combination with an axle, and a wheel-hub, of a steering-fork secured to the axle, and having vertical trunnions engaging the hub and arranged in the vertical plane of the axis of revolution of the hub, the arms of said fork, between the trunnions and axle, being offset from said plane.

27. The combination with an axle, and a wheel-hub, of a steering-fork extending from the axle and projecting into the hub, the exterior surfaces of the fork-arms within the hub being curved to conform to adjacent surfaces of the hub when the latter is adjusted about its steering-trunnions.

28. The combination with an axle, and a wheel-hub, of a steering-fork extending from the axle and projecting into the hub, the fork-arms within the hub being substantially triangular in cross-section and having curved exterior surfaces conforming to the adjacent surfaces of the hub when the latter is adjusted about its steering-trunnions.

In testimony whereof I affix my signature in presence of two witnesses.

EDWARD P. COWLES.

Witnesses:
    J. L. HERZOG,
    S. B. CRAIG.